US010149301B2

(12) United States Patent
Sorrentino

(10) Patent No.: US 10,149,301 B2
(45) Date of Patent: *Dec. 4, 2018

(54) METHODS AND ARRANGEMENTS FOR DEVICE DISCOVERY

(71) Applicant: Telefonaktiebolaget LM Ericsson (publ), Stockholm (SE)

(72) Inventor: Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,407

(22) Filed: Jul. 26, 2017

(65) Prior Publication Data

US 2017/0325240 A1    Nov. 9, 2017

Related U.S. Application Data

(63) Continuation of application No. 14/400,259, filed as application No. PCT/SE2014/051177 on Oct. 7, 2014, now Pat. No. 9,807,774.

(Continued)

(51) Int. Cl.
*H04W 72/08* (2009.01)
*H04W 12/02* (2009.01)
(Continued)

(52) U.S. Cl.
CPC .............. *H04W 72/08* (2013.01); *H04W 4/70* (2018.02); *H04W 8/005* (2013.01); *H04W 12/02* (2013.01); *H04W 76/14* (2018.02)

(58) Field of Classification Search
CPC ....... H04W 12/02; H04W 8/005; H04W 4/70; H04W 72/08; H04W 12/10
See application file for complete search history.

(56) References Cited

U.S. PATENT DOCUMENTS 9,521,537 B2 * 12/2016 Sorrentino ............ H04W 12/08
9,807,774 B2 * 10/2017 Sorrentino ............ H04W 8/005
(Continued)

FOREIGN PATENT DOCUMENTS

| CN | 101790852 A | 7/2010 |
| JP | 2010533428 A | 10/2010 |
| JP | 2012095191 A | 5/2012 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0, Sep. 2014, 1-124.

(Continued)

*Primary Examiner* — Diane Mizrahi
(74) *Attorney, Agent, or Firm* — Murphy, Bilak & Homiller, PLLC

(57) ABSTRACT

The present disclosure relates to methods and devices for transmission of discovery signal signals and detection of discovery signal signals for device-to-device communication. According to some aspects, the disclosure relates to a method executed in a wireless terminal for transmitting a control signal for enabling device-to-device, D2D, discovery, wherein the control signal carries an identity. According to one aspect, the method comprises hashing the control signal, taking a time stamp used for the control signal transmission as one input parameter, encoding the hashed control signal, and transmitting the encoded signal.

13 Claims, 13 Drawing Sheets

Related U.S. Application Data

(60) Provisional application No. 61/887,648, filed on Oct. 7, 2013, provisional application No. 61/888,438, filed on Oct. 8, 2013.

(51) Int. Cl.
  *H04W 8/00* (2009.01)
  *H04W 4/70* (2018.01)
  *H04W 76/14* (2018.01)

(56) References Cited

U.S. PATENT DOCUMENTS

| | | |
|---|---|---|
| 2003/0016770 A1 | 1/2003 | Trans et al. |
| 2003/0086515 A1 | 5/2003 | Trans et al. |
| 2005/0186933 A1 | 8/2005 | Trans |
| 2009/0016249 A1 | 1/2009 | Li et al. |
| 2013/0177000 A1 | 7/2013 | Abraham et al. |
| 2013/0244614 A1 | 9/2013 | Santamaria et al. |
| 2014/0029701 A1 | 1/2014 | Newham et al. |
| 2015/0156723 A1 | 6/2015 | Locher |
| 2015/0304834 A1 | 10/2015 | Sorrentino |
| 2015/0351018 A1 | 12/2015 | Kim et al. |
| 2017/0041826 A1 | 2/2017 | Hersent |

OTHER PUBLICATIONS

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.

3GPP, "3rd Generation Partnership Project; Technical Specification Group Services and System Aspects; Feasibility study for Proximity Services (ProSe) (Release 12)", 3GPP TR 22.803 V12.1.0, Mar. 2013, 1-45.

3GPP, "3rd Generation Partnership Project; Technical Specification Group Services and System Aspects; Generic Authentication Architecture (GAA); Generic Bootstrapping Architecture (GBA) (Release 12)", 3GPP TS 33.220 V12.2.0, Dec. 2013, 1-92.

Unknown, Author, "Considerations on UE RRC state", ZTE, 3GPP TSG-RAN WG2 Meeting #83bis, R2-133204, Ljubljana, Slovenia, Oct. 7-11, 2013, 1-3.

Unknown, Author, "D2D discovery design with simulation results", Qualcomm Incorporated, 3GPP TSG-RAN WG1 #74bis, R1-134627, Guangzhou, China, Oct. 7-11, 2013, 1-15.

Unknown, Author, "On the Need of a Feedback Loop for D2D Communication", Huawei, HiSilicon, 3GPP TSG-RAN WGI Meeting #74bis, R1-134353, Guangzhou, China, Oct. 7-11, 2013, 1-4.

\* cited by examiner

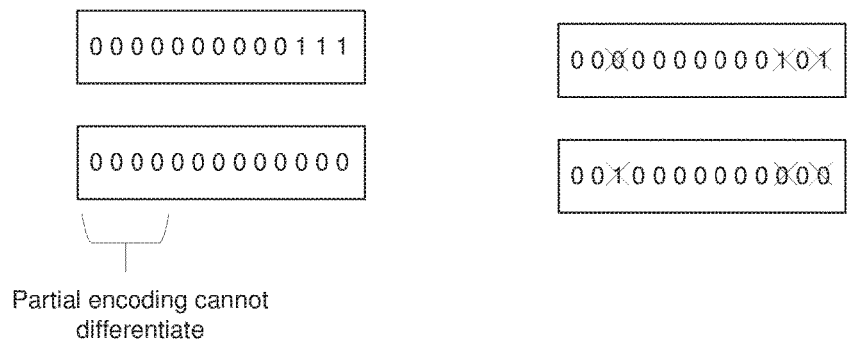
FIG.4a
FIG.4c
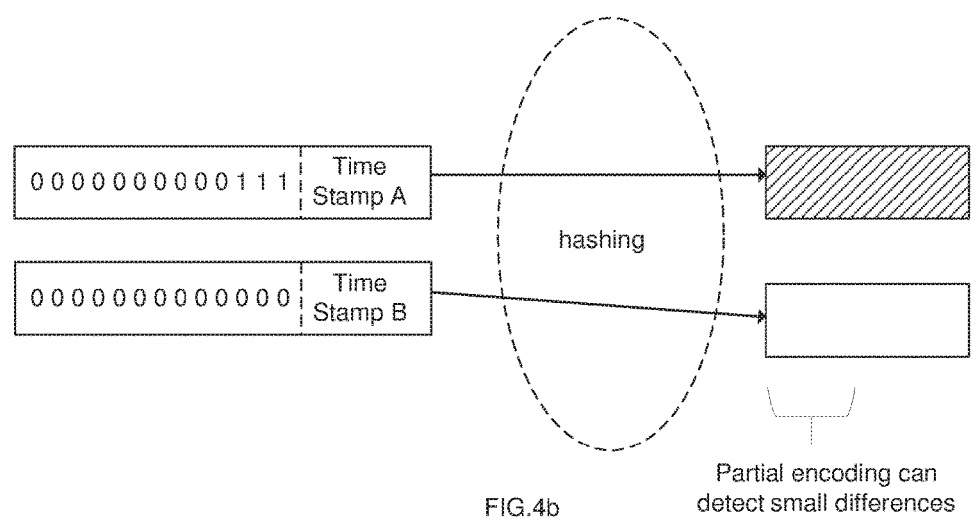
FIG.4b

US 10,149,301 B2

METHODS AND ARRANGEMENTS FOR DEVICE DISCOVERY

TECHNICAL FIELD

The present disclosure relates to methods and devices for transmission of discovery signals and detection of discovery signals for device-to-device communication.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 Hz when carrier aggregation is employed. LTE is also able to operate in different frequency bands and can operate in at least Frequency Division Duplex, FDD and Time Division Duplex, TDD, modes.

Device-to-device communication is a well-known and widely used component of many existing wireless technologies, including ad hoc and cellular networks. Examples include Bluetooth and several variants of the IEEE 802.11 standards suite such as Wi-Fi Direct. These systems operate in unlicensed spectrum.

Recently, device-to-device, D2D, communications as an underlay to cellular networks have been proposed as a means to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource and dynamic sharing between the device-to-device services and cellular services is more flexible and provides higher spectrum efficiency.

Devices that want to communicate, or even just discover each other, typically need to transmit various forms of control signaling. One example of such control signaling is the so-called discovery signal, also referred to as beacon signal or discovery beacon signal, which at least carries some form of identity, referred to as a D2D ID in this disclosure. The discovery signal may possibly carry additional information that is useful for the discovery service and is transmitted by a device that wants to be discoverable by other devices.

Other devices may scan for the discovery signal. Once they have detected the discovery signal, they can take the appropriate action, for example to try to initiate a connection setup with the device transmitting the discovery signal.

A reference discovery payload of 104 bits of discovery information plus 24 bits of CRC may be considered, as an indicative value, according to simulation assumptions in RAN1. From internal assessments, it results that the D2D ID might be in the order of 80 bits in length. Standardization of D2D is ongoing in 3GPP and more refined numbers are not available at the moment of writing this disclosure. In this disclosure, M refers to the total number of payload bits in a discovery beacon. From the perspective of this disclosure, it is not essential if M includes the CRC bits or not, if any.

A user equipment, UE, participating in discovery transmits discovery information that is potentially unique in its discovery signal. A UE that is trying to discover the first UE will try to extract the discovery information from the received discovery signal. If the second UE is successful it will call the first UE as discovered.

ProSe (Proximity Services; see 3GPP feasibility study TR 22.803) defines two types of discovery: open and restricted. With open discovery, at least at the first discovery occasion, the discovery information of a UE is not known at receiver in advance. In this case receiving discovery information is simple decoding.

In case of restricted discovery, the receiver attempts detection of a certain specific discovery signal. And the discovery information of the transmitting UE is known at the receiver before attempting discovery. According to a recent proposal (3GPP contribution paper R1-134627), the receiver does not need to successfully decode the whole discovery information, at least for restricted discovery. Instead, it may do what is referred to as "partial bit matching," which implies that only some of the bits may be correctly decoded by the receiver. An empirical bit error rate (BER) is calculated. If the BER does not exceed a certain threshold, then the receiver determines that discovery information is successfully extracted and the UE is considered as discovered.

Partial bit matching can lead to some false detection. A reason for false detection is that some bits may be erroneously decoded which could lead to an incorrect assumption of a match with the set of N compared bits. R1-134627 suggests that the false detection probability may be controlled to some extent by appropriately setting the number of bits to be correctly matched. On the other hand, increasing N reduces the computational efficiency of partial bit matching. Beyond the reduced computational complexity associated to correct decoding/detection of N bits instead of M, R1-134627 states that partial bit matching may provide increased detection probability at a given SNR operating point as compared to the case of full detection. The detection probability increases with a higher BER threshold, however this comes at the cost of increased false detection probability.

SUMMARY

An object of the present disclosure is to provide methods and corresponding devices which seeks to mitigate, alleviate, or eliminate one or more of the above-identified deficiencies in the art and disadvantages singly or in any combination.

According to some aspects, the disclosure provides a method executed in a first wireless terminal for transmitting a control signal for enabling device-to-device, D2D, discovery, wherein the control signal carries an identity. The method comprises hashing the control signal, taking a time stamp used for the control signal transmission as one input parameter, encoding the hashed control signal and transmitting the encoded signal.

According to some aspects, the control signal comprises signal payload and wherein the method further comprises inserting the time stamp used for control signal transmission in the payload of the control signal, before hashing the control signal.

According to some aspects, the disclosure relates to a first wireless terminal adapted for transmitting a control signal enabling device-to-device, D2D, discovery. The wireless terminal comprises processing circuitry adapted to cause the wireless terminal to hash the control signal, taking a time stamp used for the control signal transmission as one input parameter, baseband circuitry adapted to encode the hashed control signal and transmit circuitry adapted to transmit the encoded signal.

Some embodiments provide a method executed in a wireless terminal for transmitting a beacon signal enabling device-to-device discovery. The method comprises randomizing the beacon signal by applying a randomization function to at least part of the beacon payload. For example, the randomization function may be based on (or, stated differently, take as input parameters) one or more of timing information (e.g. the time slot or a time stamp used for beacon transmission), resource index of the beacon transmission, or terminal-specific information such as a D2D identity or a portion thereof. In a specific embodiment, the randomization function obtains different results for different beacon transmission occasions. The randomization function may be e.g. be a hashing function, a polynomial encoder, or a CRC. The beacon signal may further be encoded. The wireless terminal then transmits the beacon signal.

Some embodiments provide a method executed in a wireless terminal for discovering another wireless terminal. The wireless terminal is configured with a set of one or more identities of wireless terminals with which device-to-device communication is possible. According to this method, the wireless terminal detects the presence of a beacon signal. The wireless terminal descrambles the beacon signal using a descrambling sequence that is based on a selected identity from the set. The wireless device then decodes the beacon signal, and determines if the decoded signal matches the selected identity. The descrambling and decoding steps may be repeated until a match is found, or until all identities in the set have been selected.

Yet further embodiments provide a method executed in a wireless terminal for discovering another wireless terminal. The wireless terminal is configured with a set of one or more identities of wireless terminals with which device-to-device communication is possible. According to the method, the wireless terminal detects the presence of a beacon signal and decodes the beacon signal. The wireless terminal then descrambles the beacon signal using a descrambling sequence that is based on a selected identity from the set. The wireless terminal then determines if the beacon signal matches the selected identity. The descrambling step may be repeated until a match is found, or until all identities in the set have been selected. Stated in a different way, the wireless terminal may perform a de-randomization of the beacon signal, wherein the de-randomization function may be based on corresponding parameters as the randomization function referred to above.

According to another embodiment, a wireless device is provided which comprises baseband circuitry, transmit circuitry, a processor and a memory. The wireless terminal is configured with a set of one or more identities of wireless terminals with which device-to-device communication is possible. The memory contains instructions executable by said processor, whereby the wireless device is operative to receive a beacon signal, to descramble the beacon signal with a descrambling sequence based on a selected identity from the set, to decode the beacon signal, and to determine whether the beacon signal matches the selected identity. In some variants, the wireless device is a user equipment.

Some embodiments relates to a computer program, comprising computer readable code which, when run on wireless terminal, causes the wireless terminal to perform any of the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 4a and 4c illustrates partial bit matching.

FIG. 4b illustrates partial bit matching samples the whole beacon payload, with hashing.

DETAILED DESCRIPTION

Figure 1:
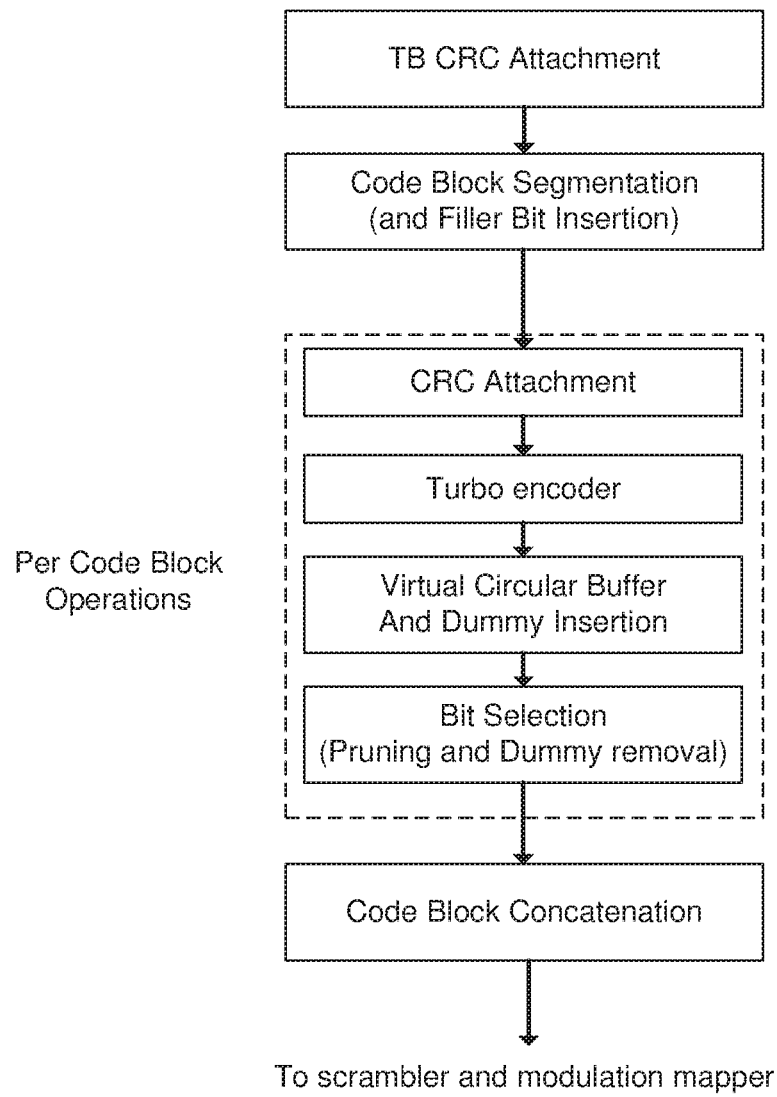
FIG. 1 illustrates downlink processing of the LTE transport blocks

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Within the context of this disclosure, the terms "wireless terminal" or "wireless device" encompass any terminal which is able to communicate wirelessly with another device, as well as, optionally, with an access node of a wireless network, by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless terminals. Hence, whenever a "user equipment" or "UE" is referred to in this disclosure, this should be understood as encompassing any wireless terminal as defined above.

Even though the following examples are described in the context of discovery signals detection for D2D, the principles described in the following disclosure may be equally applied to any detection problem where the detected sequence is compared to a known sequence.

As described above, "partial bit matching" may refer to a method where only some of the received bits need to be correctly received.

In one example the partial decoder considers the block to be correctly decoded even if only a subset N out of the number M of bits are correctly decoded. This may be the case when the channel is bad e.g. due to interference, implying that only a part of the payload is correctly decoded. If the candidate discovery signals differ by more than X bits it is still possible for the receiver to detect the correct discovery message among all candidates even if the received signal has been partially corrupted due to noise or interference.

Another example is that the receiver only compares some of the bits out of the decoded information bits, i.e. a subset N out of the number M of bits, with the known discovery information and count the number of bits matched. This also decreases complexity as there are fewer bits to be compared. This solution may be viewed as another type of "partial bit matching".

At least two issues are identified with the partial bit matching proposals mentioned above:
1) If the subsets of N information bits of 2 different discovery signals are identical, partial bit matching is unable to identify the correct sequence and consistent miss-detection happens.
2) In principle, any two discovery signal payloads may differ by 1-bit only. This implies that partial bit matching is not applicable in practice, unless restrictions on the contents of the discovery signal payloads are enforced. Such restrictions are both inefficient (they would require redundancy in the definition of the payload lengths) and complicated to be enforced in non-coordinated deployments.

The first issues is likely, e.g., if the D2D ID that may occupy ~80% of the discovery signal payload includes area identifiers that are common to multiple discovery signals, and N<<M. The remaining part of the discovery signal payload might also include system info that is common to many UEs.

For D2D discovery, UEs need to be able to discover potentially hundreds or thousands of UEs in proximity. Therefore, implementation efficiency of the solution is of primary importance.

Some embodiments herein comprise modifying the scrambling and possibly interleaving procedure in LTE when transmitting discovery signals for proximity detection, such that discovery signals with a small difference may be differentiated at the receiver side. This is accomplished by introducing a new scrambling function in the receiver, also referred to as a randomization function. The purpose is to increase the difference between the discovery signals, even when the discovery signal payloads differ by one or a few bits.

The scrambler is split into two parts: a first (new) scrambler operates on the information bits, while the existing scrambler operating on coded bits is modified such that the scrambling sequence is not a function of UE-specific parameters. Similarly, an interleaver may be added before the encoder, leading to certain detection probability advantages. Corresponding steps are performed at the receiver. The benefits of this approach are more obvious when it is applied to the partial bits detection algorithm that has been proposed. However, effects can also be seen in other cases e.g. when the discovery signal is distorted or noisy.

In the following part of this disclosure, the term "scrambling" should be interpreted in a wider sense whenever applied to the new scrambler applied before the channel encoder, as compared to the known XOR-based bitwise scrambling operation. As stated in some of the embodiments, one of the justifications for applying scrambling to the discovery signal payload is that the scrambled version of a same discovery signal should be different at different discovery signal transmissions and consistent collisions of different discovery signals should be avoided. Any randomization function of the discovery signal payload obtaining such goal may thus be equivalently applied in this disclosure. Examples of such functions are XOR-based scramblers, CRC, hashing functions, encoders, etc. In some of the embodiments, the scrambling sequence is defined as a function of parameters that vary at different transmission occasions for the same discovery signal payload. E.g., the time slot, any time stamp and/or the resource index used for discovery signal transmission may be exploited in the generation of the scrambling sequence of the discovery signal. In case the payload randomization operation is performed by using a hashing function, a polynomial encoder or a CRC, the time slot and/or any time stamp and/or the resource index used for discovery signal transmission may be inserted in the payload of the discovery signal to be hashed, in order to obtain a randomization that is a function of the specific discovery signal transmission instance. E.g., the time slot and/or any time stamp and/or the resource index used for discovery signal transmission may be prepended or appended to the discovery signal payload before hashing or polynomial encoding or CRC encoding. Any other method for obtaining randomization of the discovery signal payload to be input to the channel encoder, where the randomization is a function of the discovery signal transmission instance may be equivalently applied in this disclosure.

Optionally, the randomization may be terminal-specific. Stated differently, the randomization may be a function of a terminal-specific parameter, e.g. a D2D identity or a portion thereof. Such a parameter may be applied alone, or in addition to any of the parameters mentioned above.

Corresponding methods should be applied at the receiver for retrieving at least parts of the original discovery signal payload given the knowledge of the time slot and/or any time stamp and/or the resource index parameters used for randomizing discovery signal payload at the transmitter side.

It is proposed here to address the above issues by a modified scrambling/interleaving procedure at the transmitter and receiver of the discovery signals. As a baseline, the processing of UL and DL LTE data channels is considered.

Even though the procedures described here may be applied with conventional decoding techniques, one of the benefits of the approach described herein is that it can be applied to the partial bits matching technique mentioned above, improving its performance as described later.

Figure 2A:
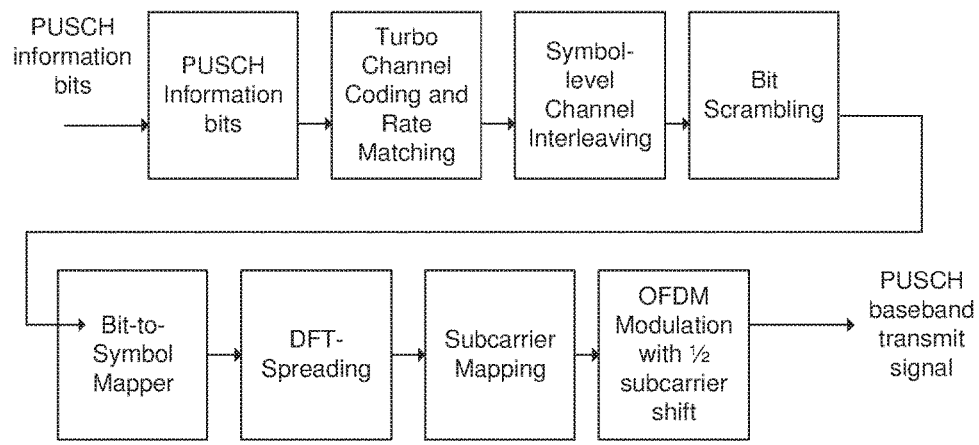
FIG. 2a illustrates uplink processing of the LTE transport blocks

For better understanding of the proposed technique, the downlink, DL, and uplink, UL, processing of LTE transport blocks will now be briefly described. FIG. 1 and FIG. 2a show, for reference, the transport block, i.e., information bits, processing in LTE DL and UL. It is noted that scrambling and interleaving are applied after the encoder, in order to scramble interference in a combination of cell-specific and UE-specific way.

Some embodiments are based on the realization that if the solutions of FIG. 1 or FIG. 2a are applied to the encoding of discovery signals, this may alleviate some of the issues listed above. This may be achieved by selecting the scrambling sequences such that they are a function of the payload of the discovery signal, of timing information (e.g. the time slot or a time stamp used for beacon transmission) or of resource index of the beacon transmission.

In one example, this is achieved by scrambling, which may also be referred to as randomizing, the discovery signal comprising an identity, using a hashing function taking a time stamp used for the discovery signal transmission as one input parameter. As stated above hashing is considered one way of scrambling or randomizing the payload. In the hashing, slight differences in input data may produce very big differences in output data, as will be further described below. When the receiver is attempting the detection of a specific discovery signal, to determine if the transmitter is in proximity, it then applies the same hashing that was applied at the transmitter side to the identity that it attempts to detect. Then, the receiver performs decoding and then performs bit matching to determine if the received identity matches the hashed identity of the UE that the receiver was attempting to detect. At this point a partial bit match may advantageously be performed, because the hashing may produce big differences in output data even for signals with small differences.

In another example, the scrambling sequence for a certain UE may be a function of the D2D identity, or a portion thereof, thereby rendering the scrambling sequence UE-specific. When the receiver is attempting the detection of a specific discovery signal, to determine if the transmitter is in proximity, it applies the corresponding UE-specific descrambling code. After descrambling, the receiver performs decoding and then performs bit matching to determine if the received identity matches the UE the receiver was attempting to detect. At this point a partial bit match may advantageously be performed, as the application of the UE-specific descrambling code provides further protection against false detection, even if the number of bits N used for the partial match is much smaller than M.

Figure 3:
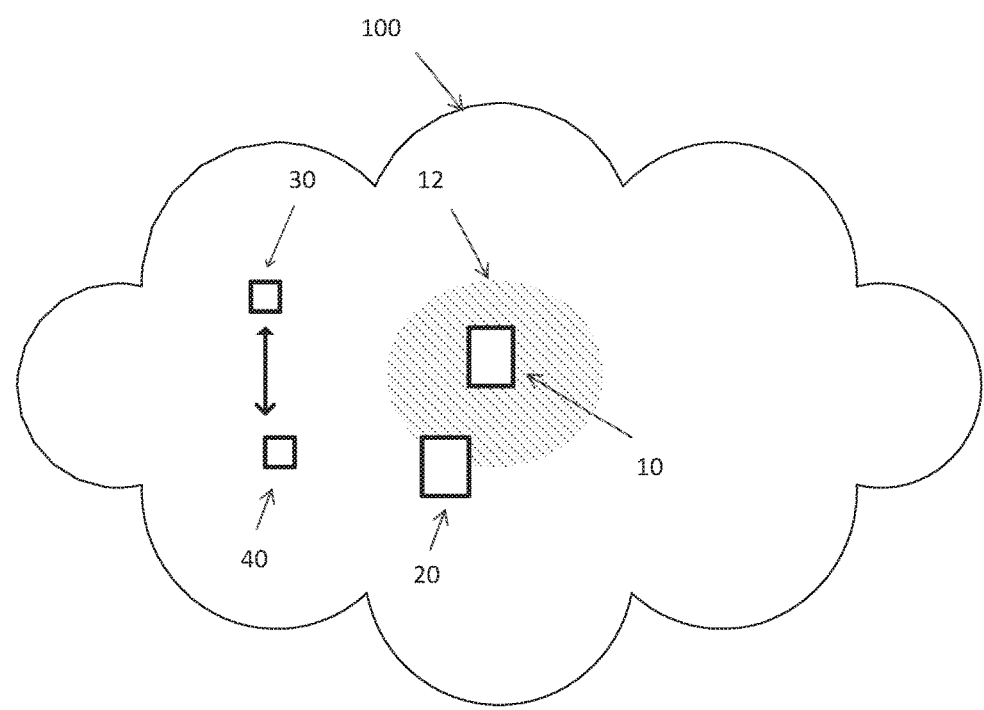
FIG. 3 illustrates an example scenario

FIG. 3 illustrates an example scenario in which various embodiments described herein may operate. This example shows a number of wireless terminals 10, 20, 30 and 40 that are capable of D2D communication. One or more of the wireless terminals may, for example, be LTE user equipments. In this example, terminals 30 and 40 have already established D2D communication which each other. Wireless terminal 10 is transmitting a discovery signal 12 (shown as a shaded circle surrounding terminal 10), which comprises an identity of the wireless terminal 10. Wireless terminal 20 is in close enough proximity to terminal 10 to be able to detect the discovery signal. Of course, other wireless terminals may also be present and some of these terminals may also be transmitting discovery signal signals, and/or be in D2D communication with other terminals. It should further be noted that wireless terminals 10 and 20 may be comprised in a wireless network 100, e.g. a cellular network. The wireless network may for example be an LTE or UMTS network. In that case, one or more of wireless terminals 10 and/or 20 may be connected to the wireless network.

The claimed method proposes splitting the scrambling and/or interleaving block into two blocks. The first block is applied to the information bits and the second block after the encoder (as in 3GPP TS 36.211 V12.3.0—FIG. 5-3.1), shown in FIG. 2b. Corresponding descrambling and/or de-interleaving steps are performed at the receiver, shown in FIG. 2c.

The interleaving step applied after the encoder may be a function of the cell-ID, the time slot, the resource index, or any other non UE-specific parameters (differently from LTE). Possibly, the interleaver may be static and pre-defined.

Several embodiments herein are thus based on the understanding that decoding is more computationally demanding than descrambling and/or de-interleaving. These embodiments allow significant computational advantage at the receiver. Additionally, these embodiments allow solving or at least alleviating the issues with the partial bits matching proposal. From a computational perspective, these embodiments require only one decoder iteration.

Figure 5:
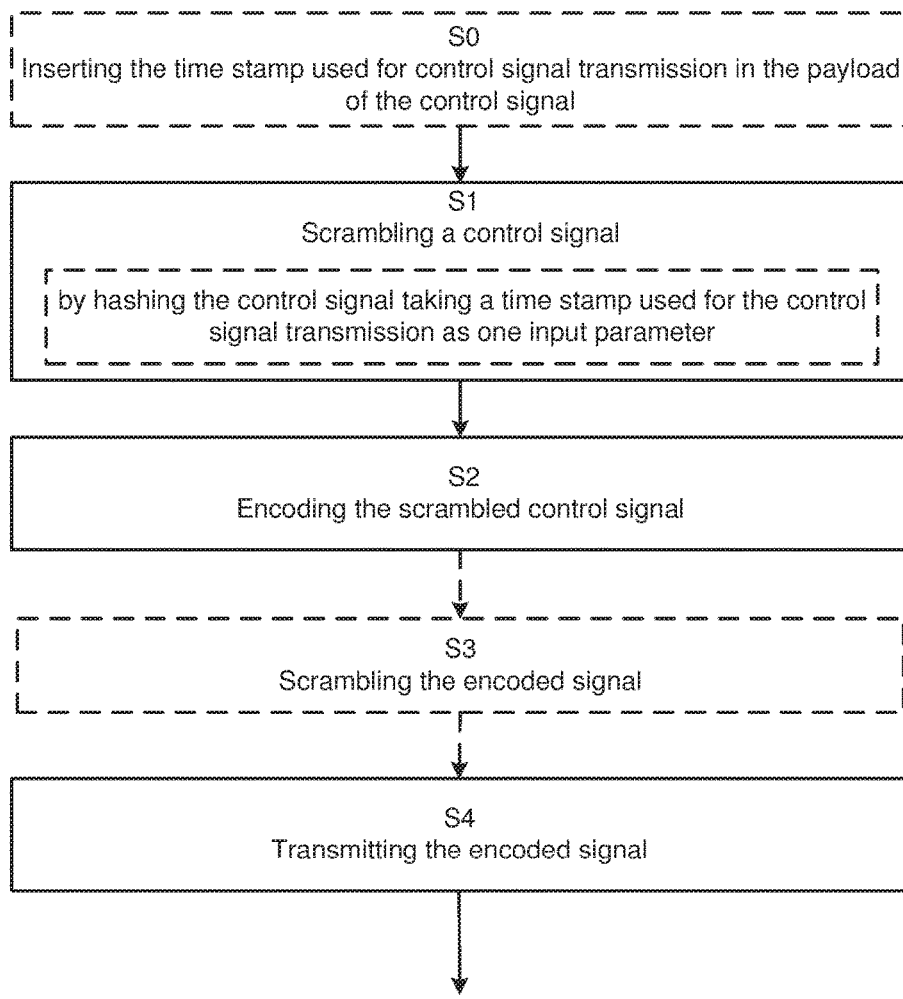
FIG. 5 illustrates a method in a wireless terminal being a transmitter.

With reference to the scenario in FIG. 3 and the flowchart in FIG. 5, a method performed in a first wireless terminal 10, e.g. an LTE user equipment, for transmitting a control signal for enabling device-to-device, D2D, discovery, wherein the control signal carries an identity, wherein scrambling is performed before encoding, will now be described. In FIG. 5 the discovery signal is randomized using a hashing function.

It should be appreciated that FIG. 5 comprises some operations which are illustrated with a darker border and some operations which are illustrated with a lighter border. The operations which are comprised in a darker border are operations which are comprised in the broader example embodiment. The operations which are comprised in a lighter border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

Both interleaver and scrambling blocks may be introduced at the transmitter, before encoding. However, the disclosed concept covers also the case where only the scrambler and only the interleaver is inserted. Such blocks provide different and combinable benefits, as explained herein. Obviously, only the corresponding blocks should be introduced at the receiver. The example in FIG. 5 comprises only a scrambler. In FIG. 5 the scrambler is implemented as a hashing function.

The scrambling step applied before the encoder is initialized by an input or scrambling sequence that is a function of the discovery signal payload and possibly additional parameters that may vary at successive discovery signal transmissions. E.g., the time slot and the resource index for discovery signal transmission may be examples of such parameters. The rationale is that the scrambled version of a certain discovery signal should be different at different discovery signal transmissions and consistent collisions of different discovery signals should be avoided.

The interleaving step applied after the encoder may be a function of the cell-ID, the time slot, the resource index, or any other non UE-specific parameters (differently from LTE). Possibly, the interleaver may be static and pre-defined.

The first wireless terminal 10 is configured to transmit a discovery signal, here referred to as a control signal, comprising an identity associated with the terminal 10. This enables other wireless terminal, such as terminal 20, to discover the presence of terminal 10 and initiate device-to-device communications with it.

According to the proposed method, the first wireless terminal 10 scrambles S1 the control signal before the encoding, with a scrambling sequence which is based on, or dependent on, the identity associated with the terminal 10. Stated differently, the scrambling sequence is a function of the identity of the wireless terminal. Stated in yet another way, the scrambling sequence is a function of at least one user-specific, or terminal-specific, input parameter.

In some embodiments, the scrambling implies that the wireless device hashes S1 the control signal, taking a time stamp used for the control signal transmission as one input parameter. The time stamp is e.g. a date-time format and shall be encoded according to Annex B.2.1.2 of 3GPP TS 33.220 V12.2.0. The control signal comprises signal payload and according to some aspects, the method further comprises inserting S0 the time stamp used for control signal transmission in the payload of the control signal, before hashing the control signal. The hashing function uses a hashing key that is e.g. specific to a restricted users group.

FIGS. 4a and 4b illustrates that partial bit matching is unable to differentiate signals wherein the payload only differs in one of a few bits. In FIG. 4a all bits are not matched. In FIG. 4b three bits are wrongly decoded, which leads to that the two packets cannot be differentiated.

FIG. 4b illustrates that partial bit matching can differentiate the discovery signals of FIG. 4a after applying a hashing function on the discovery signals, taking a time stamp used for the control signal transmission as one input parameter. In the hashing, slight differences in input data may produce big differences in output data.

Alternatively, the input parameter to the scrambling may be based on, or dependent on, some part of portion of the identity. In a particular variant, the identity comprises one portion which is shared by several wireless terminals (e.g. comprising an area identifier or other common information), and another portion which is unique to the wireless terminal 10, and the scrambling sequence is based on, or dependent on, the portion of the identity which is unique to the wireless terminal 10.

In a further alternative, the input parameter e.g. the scrambling sequence is a function of all of, or a part of, the payload of the discovery signal.

Optionally, the wireless terminal 10 also performs interleaving, not shown, of the discovery signal. If interleaving is applied, it may be performed before and/or after the encoding step. When interleaving is performed before encoding, as shown in FIG. 13, it may be based either on non-terminal specific parameters (also referred to as common parameters), or on terminal-specific parameters, or a combination of both. However, when interleaving is performed after encoding, the interleaving should preferably not be based on terminal-specific parameters, as the receiver would then be required to perform the decoding step multiple times.

According to the method, wireless terminal 10 then encodes S2 the discovery signal, i.e. the hashed control signal. Hence, in this embodiment encoding is performed after performing terminal-specific scrambling. A benefit of this approach is that it enables an efficient detection of the discovery signal at the receiver side, as the receiver will not be required to decode the signal multiple times.

The wireless terminal 10 then transmits S4 the discovery signal, enabling discovery by other devices and potentially also initiation of D2D communication with such devices.

In some variants, an additional scrambling step S3 may optionally be performed after encoding (and before transmission). The discovery signal is then scrambled with a second scrambling sequence which is not dependent on any terminal-specific parameters, or stated differently, not based on or dependent on the terminal's identity, or stated in yet another way, not based on or dependent on the discovery signal payload. The second scrambling sequence may instead be based on common parameters, e.g. the time slot and/or resource index of the discovery signal transmission.

In yet further variants, interleaving may be performed before as well as after encoding. In this case, the interleaving step performed after encoding is preferably based only on non-terminal-specific parameters, in order to maintain the benefit of more efficient detection on the receiver side. The interleaving step performed before encoding may be based on terminal-specific parameters and potentially also on common parameters.

The corresponding detection procedure is exemplified in 6a. The receiver performs descrambling/de-interleaving according to the non-beacon-specific scrambling sequence/ interleave initialization. The resulting sequence is decoded only once. Once detection is performed, the receiver iterates multiple detection attempts using the list of UEs potentially in proximity.

In one example, at each detection attempt the decoded bits are compared to the interleaved and/or scrambled hypothesis according to the interleaver and/or scrambler defined in this disclosure.

In another implementation alternative, at each detection attempt the decoded bits are de-interleaved and descrambled according to the interleaver and/or scrambler defined in this disclosure and compared to the payload of the hypothesis beacon.

Combinations of the above examples are possible. e.g., if the de-interleaver is not UE-specific, it may be applied directly after the decoder avoiding to iterate it.

In one example, one detection attempt may be performed for each of the UEs potentially in proximity.

In another example, the detection attempts are stopped as soon as one detection attempt based on one of the UEs potentially in proximity is successful.

In a further example, the detection step may be performed according to the partial bits matching technique. In this case, only N out of M bits are decoded and compared to the expected bits. A non-zero BER threshold may be considered for declaring the beacon detection successful. The comparison may be equivalently performed on the scrambled or interleaved information bits.

Figure 6A:
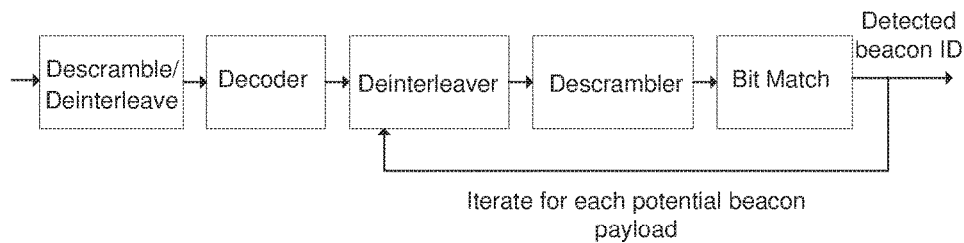
FIGS. 6a and 6b illustrate a method in a wireless terminal being a receiver.

With reference to the scenario in FIG. 3 and the flowchart in FIG. 6a, a method performed in a second wireless terminal 20, e.g. an LTE user equipment, for discovering a first wireless terminal 10, wherein the second wireless terminal is configured with a set of one or more identities of wireless terminals with which device-to-device, D2D, communication is possible, will now be described. This is the receiver-side method corresponding to the method shown in FIG. 5.

The wireless terminal 20 receives S11, or detects the presence of, a control signal. The control signal is a discovery signal transmitted from terminal 10. This discovery signal comprises an identity associated with the terminal 10. The wireless terminal is configured with a list (or a set) of one or more identities of wireless terminals for which D2D communication is possible. This list may, for example, be configured by wireless network 100 or by some other means. According to some aspects, the identity comprises an identity of the wireless terminal 10. According to some aspects, the identity comprises a ProSe user identity and/or an application layer user identity.

Optionally, the wireless terminal descrambles S12 the signal using a non-terminal-specific descrambling sequence. This option applies if a corresponding non-terminal-specific scrambling step was performed by the transmitter.

The wireless terminal then decodes S13 the signal. The decoding should of course be performed such that the encoding that was performed by the transmitter is reversed. The decoding parameters to use, may e.g. be preconfigured by reference to a technical standard, or may be configured via signaling e.g. from network 100.

Optionally, de-interleaving of the signal is performed, if a corresponding interleaving step was performed by the transmitter.

In the receiver, the identity which the receiver is attempting to match is scrambled S14 (potentially together with additional information comprised in the discovery signal payload), and optionally interleaved if interleaving was applied by the transmitter. In this example the scrambling is implemented as a hashing function.

Hence, in the example embodiment using hashing, this step implies hashing S14 a reference control signal comprising one of the one or more identities, taking a time stamp used for the control signal transmission as one input parameter. Then, the received discovery signal is compared S15 with the scrambled (and optionally interleaved) information in order to determine if there is a match. Steps S14 and S15 are performed for each identity until all the identities in the set have been compared or until a match is found.

In other words, detection may be achieved either by descrambling/de-interleaving the received information, or conversely by scrambling/interleaving the data that the received information is to be compared against.

Figure 6B:
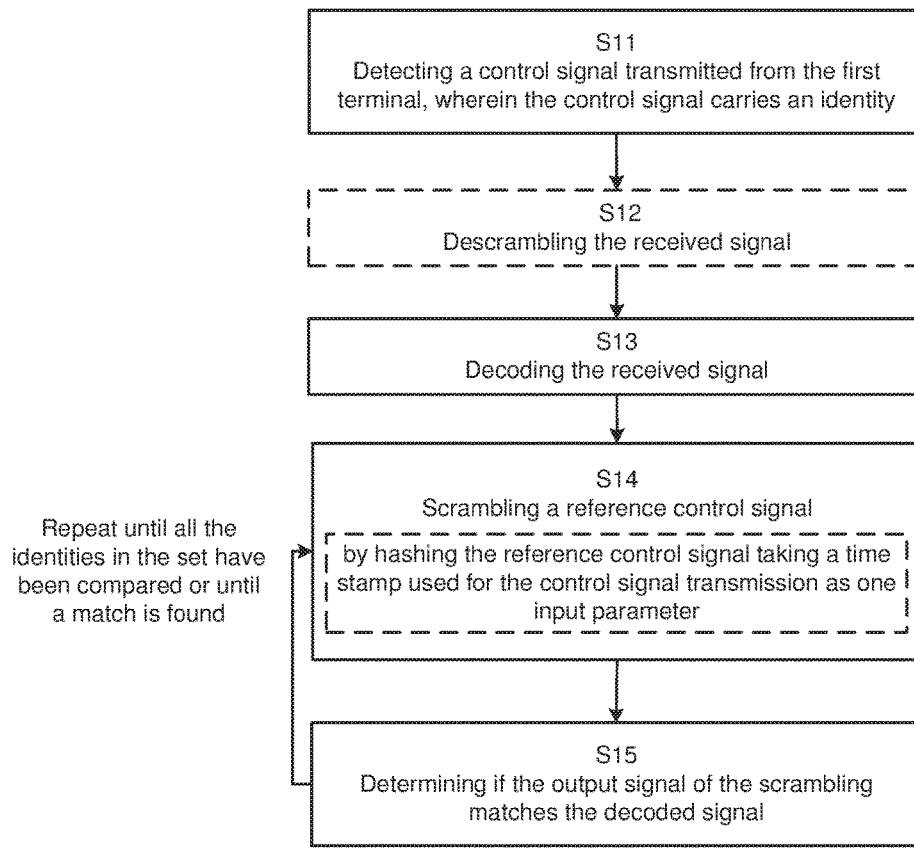
Figure 7:
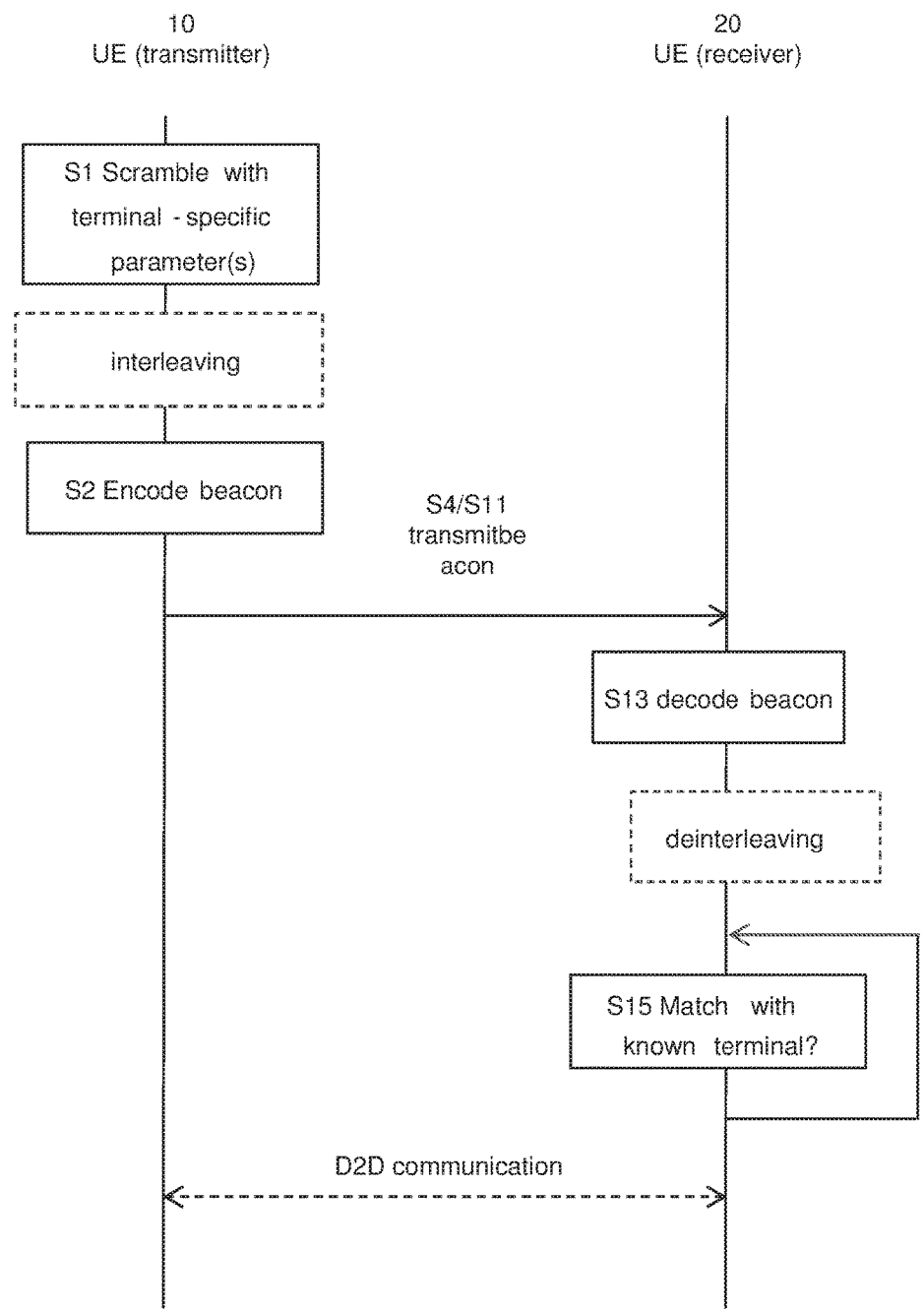
FIG. 7 is a signaling diagram and flowchart combining methods of FIGS. 5 and 6.

FIG. 7 illustrates how the transmitter-side method of FIG. 6 may interact with the receiver side method of FIG. 5.

An advantage of applying a user-specific, or terminal-specific, scrambling sequence, as shown in FIGS. 5-7, is that when partial bit matching is applied, the risk of false detection as described above is minimized or at least reduced.

Variations of the claimed technique will now be described referring to FIGS. 9-12.

Figure 9:
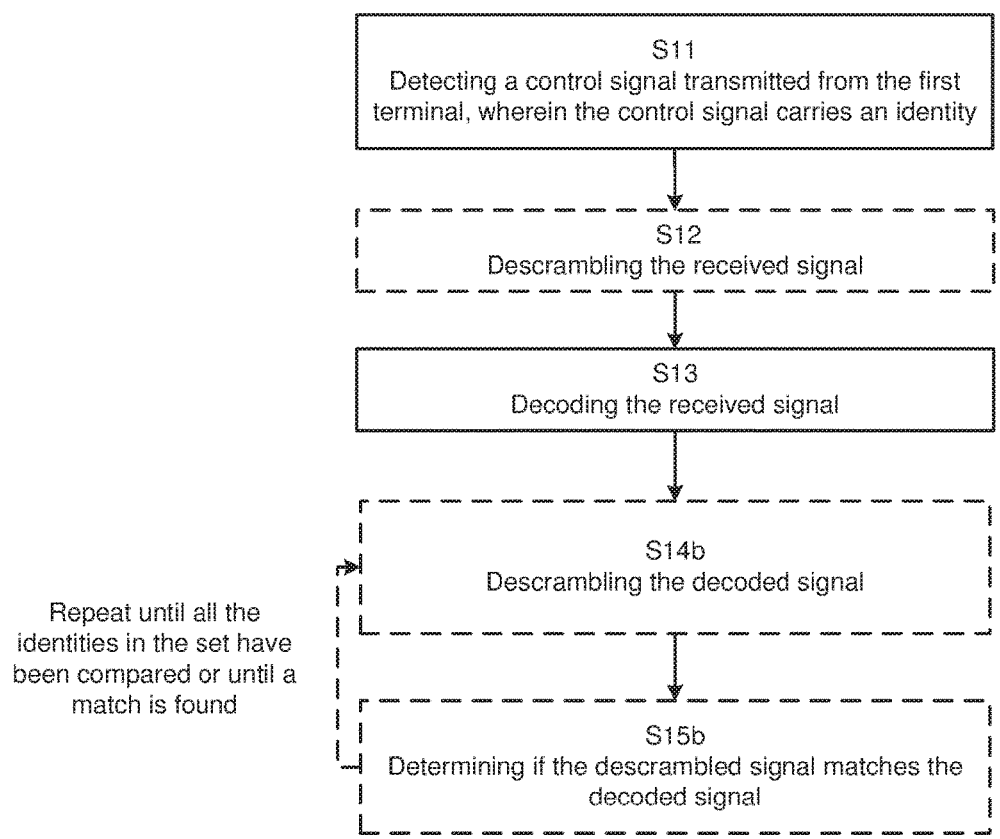
FIG. 9 shows a variant of a method in a receiver.

In one implementation alternative shown in FIG. 9, at each detection S11 attempt the decoded bits are de-interleaved and descrambled S12 according to the interleaver and/or scrambler defined in this disclosure and compared to the payload of the hypothesis beacon.

As in the example of FIG. 6b, the wireless terminal 20 then decodes S13 the signal. The decoding should of course be performed such that the encoding that was performed by the transmitter is reversed. Which decoding parameters to use may e.g. be preconfigured by reference to a technical standard, or may be configured via signaling e.g. from the wireless network 100.

Optionally, de-interleaving of the signal is performed, if a corresponding interleaving step S12 was performed by the transmitter.

In order to determine if the detected beacon corresponds to one of the known wireless terminals for which D2D communication is enabled, the wireless terminal 20 repeatedly attempts to descramble S14b and match S15b the received beacon signal with known identities from the list, until a match is found or until there are no more known identities to try. It is also possible for the terminal to keep testing for known identities even after a match is found, in order to further reduce the risk of false detection. Notably, in this embodiment the decoding step does not need to be repeated, because the transmitter performed terminal-specific scrambling before the encoding step (see FIG. 5). If terminal-specific interleaving was performed on the transmitter side, as will be described in FIG. 10, the de-interleaving step will have to be repeated for each identity which is to be tested.

The wireless terminal 20 descrambles the signal using a terminal-specific descrambling sequence which is based on, or dependent on, one of the known identities in its list. The descrambling sequence should of course be selected in order to undo the scrambling that was performed on the transmitter side, hence all the alternatives described in connection with FIG. 5 for obtaining the scrambling sequence apply mutatis mutandis.

Knowledge of how to select the descrambling sequence may for example be encoded in a technical standard, or possibly signaled to the wireless terminal 20 e.g. from the wireless network 100.

The wireless terminal 20 then determines if the beacon signal, or more specifically the payload of the beacon corresponding to the identity of the wireless terminal 20, matches the known identity (the same identity that was applied in the descrambling step). This may be performed by doing a complete bit match, or advantageously by partial bit matching of a subset N of the M bits that make up the identity, as has been described above.

Assuming that the list of known terminals includes the identity of wireless terminal 10, i.e. the method of FIG. 15 results in a match, the wireless terminal 20 may then proceed to initiate or setup D2D communications with the wireless terminal 10.

It is pointed out that although our example suggested scrambling being performed before interleaving, the order of these steps may be reversed in some embodiments. The order of the descrambling and de-interleaving steps at the receiver side will then be modified accordingly so that descrambling is performed before the de-interleaving step. However, this also implies that both descrambling and de-interleaving need to be reiterated for each identity that the receiver attempts to match.

Another example method executed in a wireless terminal 10, e.g. an LTE user equipment, will now be described with reference to FIG. 3 and the flowchart shown in FIG. 10. In this example the new scrambler S3b (which corresponds to both steps S1 and S3 in FIG. 5) is implemented after the encoder S2b.

The wireless terminal 10 is configured to transmit a discovery signal comprising an identity associated with the wireless terminal 10. This enables other wireless terminal, such as the wireless terminal 20, to discover the presence of the wireless terminal 10 and initiate device-to-device communications with it.

According to the method, the wireless terminal 10 encodes S2 the discovery signal. The wireless terminal 10 then scrambles S3*b* the signal with a scrambling sequence which is based on, or dependent on, the identity associated with the wireless terminal 10. Stated differently, the scrambling sequence is a function of the identity of the wireless terminal 10. Stated in yet another way, the scrambling sequence is a function of at least one user-specific, or terminal-specific, input parameter.

Alternatively, the scrambling sequence may be based on, or dependent on, some part of portion of the identity. In a particular variant, the identity comprises one portion which is shared by several wireless terminals (e.g. comprising an area identifier or other common information), and another portion which is unique to the wireless terminal 10, and the scrambling sequence is based on, or dependent on, the portion of the identity which is unique to the wireless terminal 10.

In a further alternative, the scrambling sequence is a function of all of, or a part of, the payload of the beacon.

Optionally, the wireless terminal 10 also performs interleaving S35*b* of the beacon signal.

The wireless terminal 10 then transmits the beacon signal, enabling discovery by other devices.

A corresponding method performed in a wireless terminal on the receiving side, e.g. wireless terminal 20 in FIG. 3, will now be described with reference to the flow chart in FIG. 11*b*.

The wireless terminal receives, or detects S11*c* the presence of, a beacon signal from wireless terminal 10. The wireless terminal is configured with a list of one or more identities of wireless terminals with which D2D communication is possible (or, stated differently, wireless terminals with which the wireless terminal 10 is allowed to, or enabled to, establish D2D communication). This list may, for example, be configured by the wireless network 100 or by some other means.

Optionally, the wireless terminal de-interleaves S115*c* the signal. This option applies if a corresponding interleaving step S35 was performed at the transmitter (see FIG. 10).

In order to determine if the detected beacon corresponds to one of the known wireless terminals for which D2D communication is enabled, the wireless terminal repeatedly attempts to decode S13*c* and match S15*c* the received beacon signal with known identities from the list, until a match is found or there are no more known identities to try. It is also possible for the terminal to keep testing for known identities even after a match is found, in order to further reduce the risk of false detection.

The wireless terminal 20 descrambles S14*c* the signal using a descrambling sequence which is based on, or dependent on, one of the known identities in its list. The descrambling sequence should of course be selected in order to undo the scrambling that was performed on the transmitter side, hence the same alternatives as described in conjunction with FIG. 10 apply.

Knowledge of how to select the descrambling sequence may for example be encoded in a technical standard, or possibly signaled to the wireless terminal 20 e.g. from the wireless network 100.

The wireless terminal 20 then attempts to decode the signal. Once again the decoding should of course be performed such that the encoding that was performed by the transmitter is reversed.

The wireless terminal 20 then determines if the beacon signal, or more specifically the payload of the beacon corresponding to the identity of the wireless terminal, matches the known identity (the same identity that was applied in the descrambling step). This may be performed by doing a complete bit match, or advantageously by partial bit matching of a subset N of the M bits that make up the identity, as has been described above.

Figure 12:
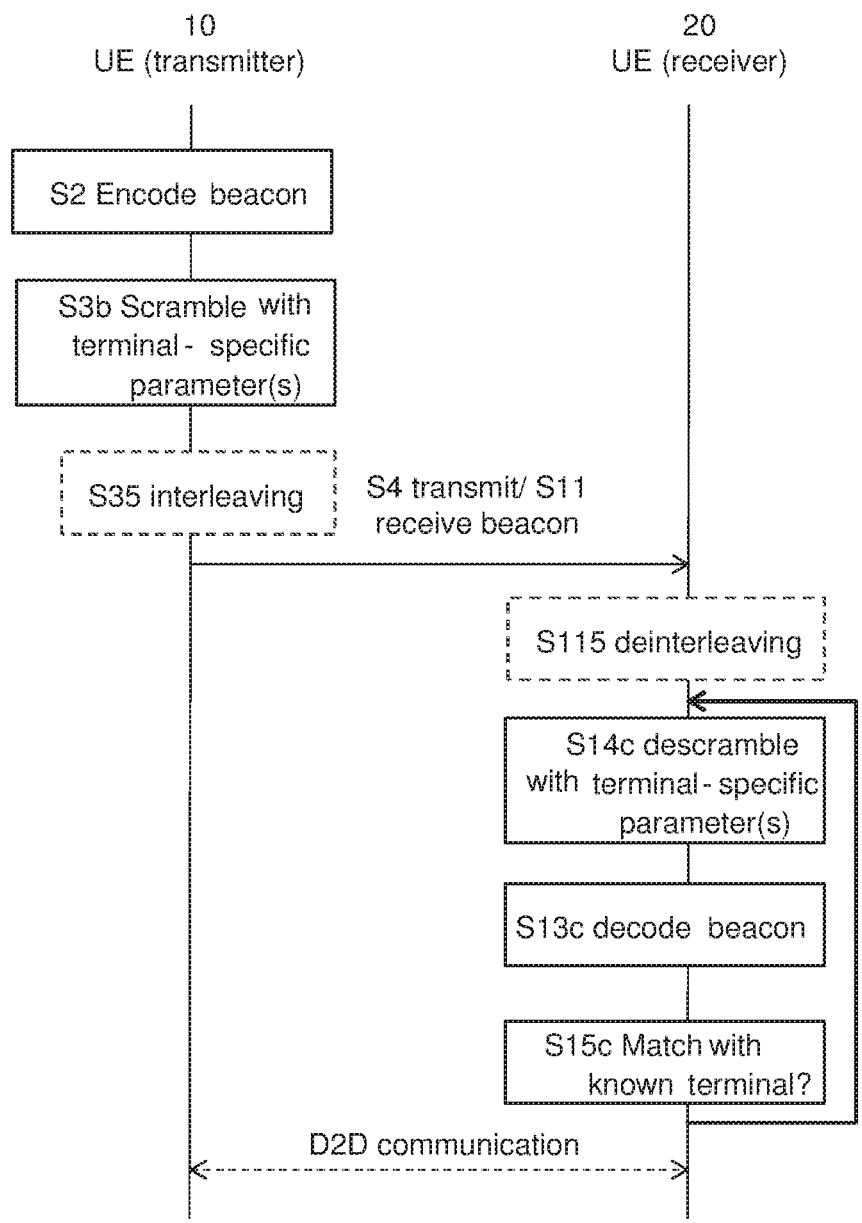
FIG. 12 is a signaling diagram and flowchart combining methods of FIGS. 10 and 11.

Assuming that the list of known terminals includes the identity of the wireless terminal 10, i.e. the method of FIG. 12 results in a match, the wireless terminal 20 may then proceed to initiate or setup D2D communications with the wireless terminal 10.

Figure 10:
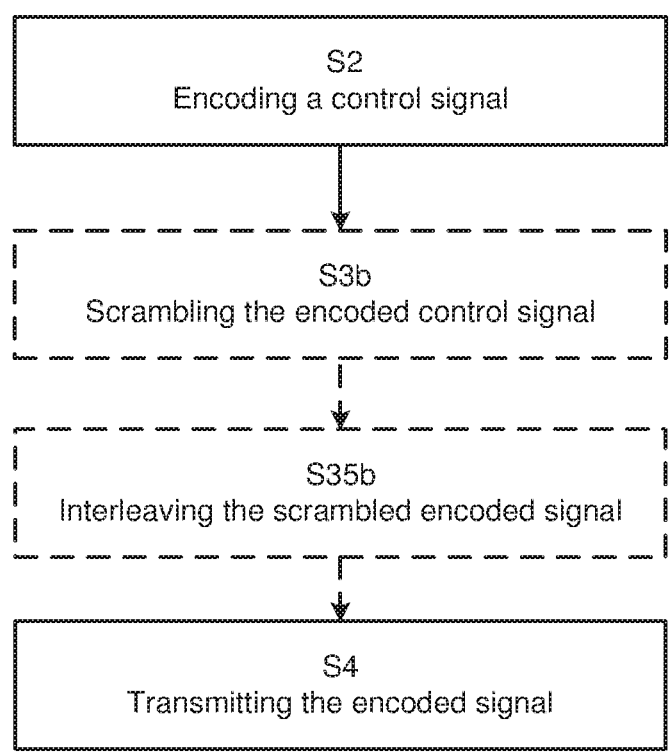
FIG. 10 illustrates a variant of a method in a wireless terminal being a transmitter.
Figure 11A:
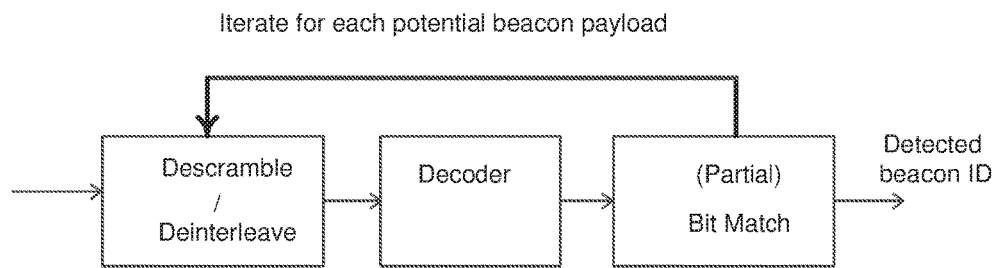
FIGS. 11a and 11b illustrate a variant of a method in a wireless terminal being a receiver.
Figure 11B:
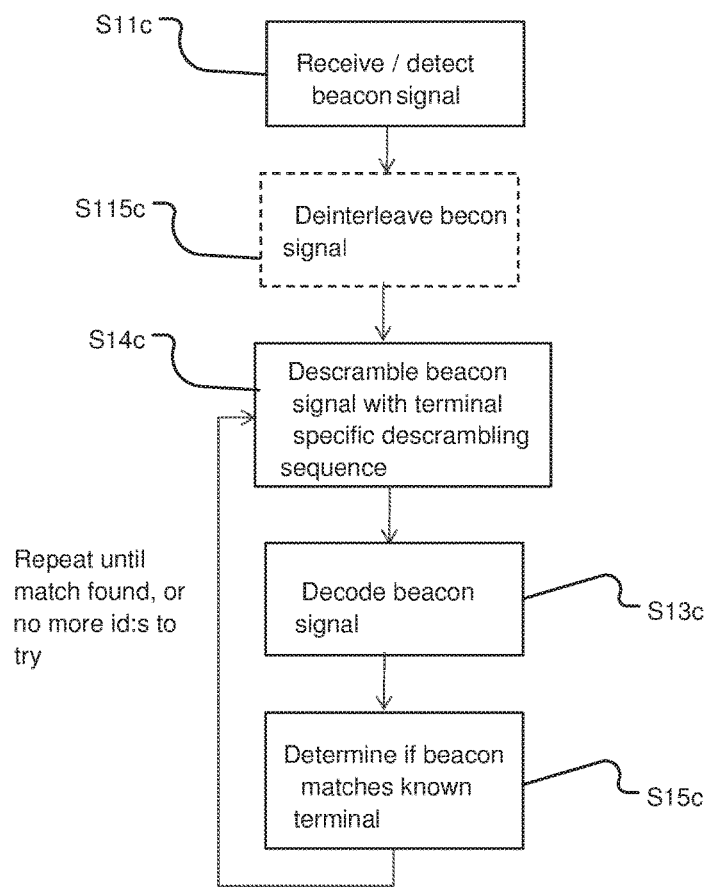

FIG. 12 is a combined signaling diagram and flow chart which shows how the methods of FIG. 10 (transmitter) and FIG. 11*b* (receiver) may interact.

The methods of FIG. 10-12 may be applied in particular in a scenario where the possible number of other devices, e.g. UE:s, that may be detected by a receiver is limited—or stated differently, when the list of known identities that the wireless terminal 20 is configured to attempt to decode is reasonably short.

However, a possible drawback of this solution is that the receiver needs to perform a decoding attempt for each UE potentially in proximity. Assuming that the receiver may have at any time a list of hundreds or thousands of UEs potentially in proximity, the computational complexity induced by so many decoding attempts might be excessive. The detection procedure is exemplified in FIG. 11*a*.

Figure 2B:
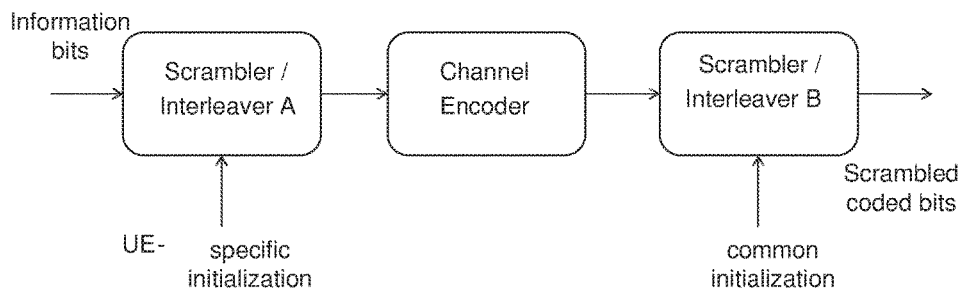
FIG. 2b shows the proposed interleaving/scrambling procedure (transmitter)
Figure 2C:
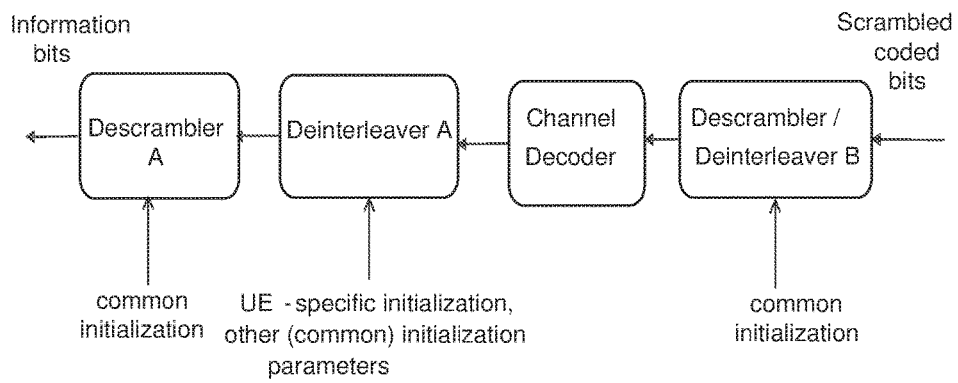
FIG. 2c shows the proposed de-interleaving/descrambling procedure (receiver)
Figure 8A:
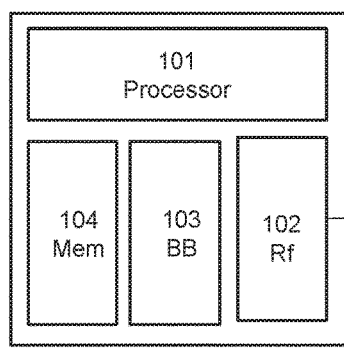
FIGS. 8a and 8c illustrate an example wireless terminal being a transmitter.

FIG. 8*a* illustrates an example wireless terminal in which any of the methods of FIG. 2*b*, 5 or 10 may be implemented.

According to an embodiment, a wireless device 10 is provided which comprises means adapted to scramble a discovery signal with a terminal-specific scrambling sequence, to encode the discovery signal, and to transmit the discovery signal. In some variants, to scramble implies to hash the control signal, taking a time stamp used for the control signal transmission as one input parameter. In some variants, the wireless device is a user equipment. The wireless device may further be adapted to perform any of the method steps described in connection with FIG. 2*b*, 5 or 10.

In a particular embodiment, illustrated in FIG. 8*a*, the wireless device may comprise baseband circuitry 103 adapted to scramble the discovery signal with a terminal-specific scrambling sequence, and to encode the discovery signal. The wireless device may further comprise transmit circuitry 102, typically a radio, Rf, transmitter, adapted to transmit the discovery signal. The transmit circuitry may be associated with one or more physical antennas over which the discovery signal is transmitted. In some variants, the wireless device may further comprise a processor 101 and a memory 104. In some variants, the processor is adapted to hash the control signal, taking a time stamp used for the control signal transmission as one input parameter.

Figure 8B:
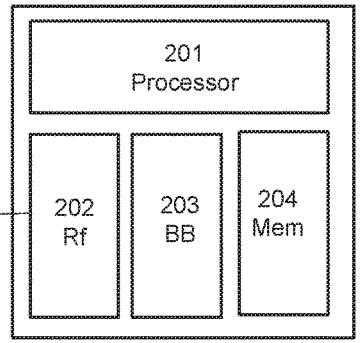
FIGS. 8b and 8d illustrate an example wireless device being a receiver.
Figure 8C:
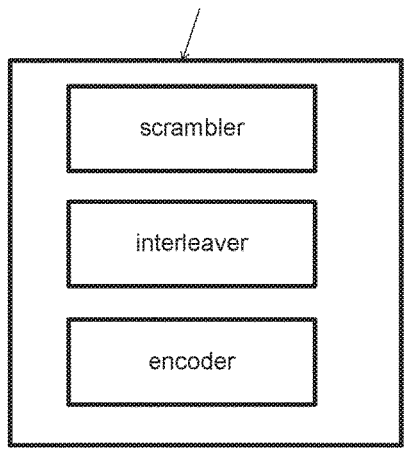

In another particular embodiment, illustrated in FIG. 8*c*, the wireless device 10 may comprise a scrambler adapted to scramble the discovery signal with a terminal-specific scrambling sequence, and an encoder adapted to encode the discovery signal. In some variants, the scrambler is adapted to hash the control signal, taking a time stamp used for the control signal transmission as one input parameter. The wireless device may optionally comprise an interleaver adapted to interleave the discovery signal. The scrambler, encoder and interleaver may be provided in a baseband processing unit 103. The baseband processing unit may be the baseband circuitry 103 shown in FIG. 8*a*.

The wireless device may further comprise a transmitting unit adapted to transmit the discovery signal, e.g. via the transmit circuitry and antenna shown in FIG. 8*a*.

According to another embodiment, a computer program is provided comprising instructions which, when executed on at least one processor (e.g. the processor shown in FIG. 8*a*), cause the at least one processor to carry out the method described in connection with any one of Figures FIG. 2b, 5 or 10.

According to yet another embodiment, a carrier is provided containing the computer program described in the previous paragraph. The carrier may be an electronic signal, optical signal, radio signal, or computer readable storage medium.

FIG. 8b illustrates an example wireless device 20 in which any of the methods of FIG. 2c, 6, 9 or 11 may be implemented. The wireless device 20 is adapted for discovering first wireless terminal, wherein the second wireless terminal is adapted with a set of one or more identities of wireless terminals with which device-to-device, D2D, communication is possible According to an embodiment, a wireless device is provided which comprises means adapted to store a set of one or more identities of wireless terminals with which device-to-device communication is possible, to receive a discovery signal, to descramble the received discovery signal with a descrambling sequence which is based on a selected identity from the set, to decode the discovery signal, and to determine if the decoded signal matches the selected identity. Alternatively, a wireless device is provided which comprises means adapted to store a set of one or more identities of wireless terminals with which device-to-device communication is possible, to receive a discovery signal, to decode the discovery signal, to scramble a selected identity from the set, and to determine if the decoded signal matches the scrambled selected identity. According to some aspects to descramble a selected identity implies to hash a reference control signal comprising one of the one or more identities, taking a time stamp used for the control signal transmission as one input parameter.

In some variants, the wireless device is a user equipment. The wireless device may further be adapted to perform any of the method steps described in connection with FIG. 2c, 6, 9 or 11.

In a particular embodiment, illustrated in FIG. 8b, the wireless device may comprise receive circuitry adapted to receive the discovery signal. The wireless device may further comprise baseband circuitry 203 adapted to scramble an identity (or to descramble the discovery signal with the descrambling sequence), and to decode the discovery signal. Alternatively the descrambling or scrambling is performed in a processing circuitry 201. According to some aspects the baseband circuitry 203 or processing circuitry 201 is adapted to hash a reference control signal comprising one of the one or more identities, taking a time stamp used for the control signal transmission as one input parameter and to compare the output signal of the hashing with the decoded signal, for each identity until all the identities in the set have been selected or until a match is found.

The receive circuitry 202 may be associated with one or more physical antennas over which the discovery signal is received. The wireless device may further comprise a memory 204 adapted to store a set of one or more identities of wireless terminals with which device-to-device communication is possible. In some variants the wireless device may further comprise a processor.

Figure 8D:
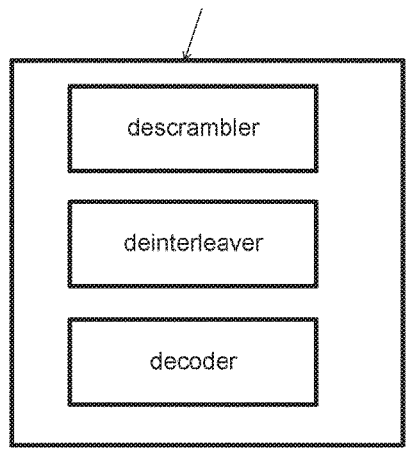

In another particular embodiment, illustrated in FIG. 8d, the wireless device may comprise a descrambler adapted to descramble the discovery signal (or to scramble a reference control signal comprising one of the one or more identities), and an decoder adapted to decode the discovery signal. Further, the wireless device 20 may comprise a receiving unit adapted to receive the discovery signal. The wireless device may also comprise means for storing the set of one or more identities in a storage unit. The wireless device may optionally comprise an de-interleaver adapted to de-interleave the discovery signal. The descrambler, decoder and de-interleaver may be provided in a baseband processing unit 203. The baseband processing unit 203 may be the baseband circuitry 203 shown in FIG. 8b. The storage unit may be the memory 204 shown in FIG. 8b.

According to another embodiment, a computer program is provided comprising instructions which, when executed on at least one processor (e.g. the processor shown in FIG. 8b), cause the at least one processor to carry out the method described in connection with any one of FIG. 2c, 6, 9 or 11.

According to yet another embodiment, a carrier is provided containing the computer program described in the previous paragraph. The carrier may be an electronic signal, optical signal, radio signal, or computer readable storage medium.

Figure 13A:
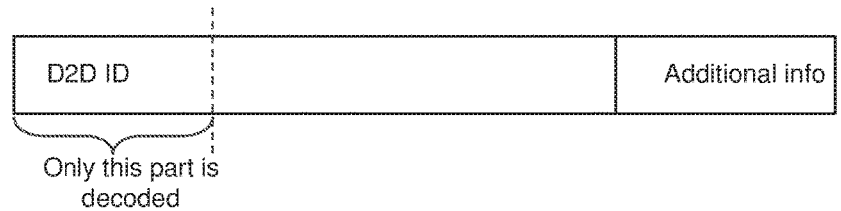
FIG. 13a illustrates partial bit matching being limited to a fraction of the beacon payload, without the proposed solution.

In light of the embodiments presented above, the issues associated to partial bits matching may be solved or at least alleviated when interleaving and/or scrambling is performed before encoding. In more detail, advantages of such methods include. FIG. 13a illustrates that without the proposed solution, partial bit matching is limited to a fraction of the beacon payload.

Figure 13B:
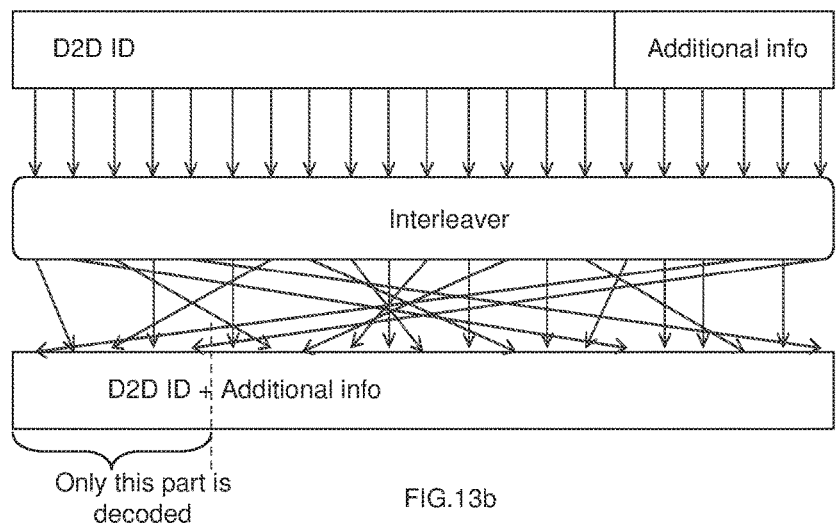
FIG. 13b illustrates partial bit matching samples the whole beacon payload sparsely, with a new interleaver.

If an interleaver is provided before the encoder (and corresponding de-interleaver at the receiver) according to embodiments herein, the information bits are spread pseudo-randomly such that different portions of the information payload are sampled in the N bits selected for partial bits matching, reducing the probability of false detection. E.g., the D2D ID may comprise a geographical area-identifier part that is common to multiple discovery signals. If the N bits happen to be extracted from such field, the detection would be ambiguous. On the other hand, the interleaver proposed here ensures that the fields within the discovery signal are sampled pseudo-randomly FIG. 13b illustrates that with the proposed interleaver, partial bit matching samples the whole beacon payload sparsely.

Figure 13C:
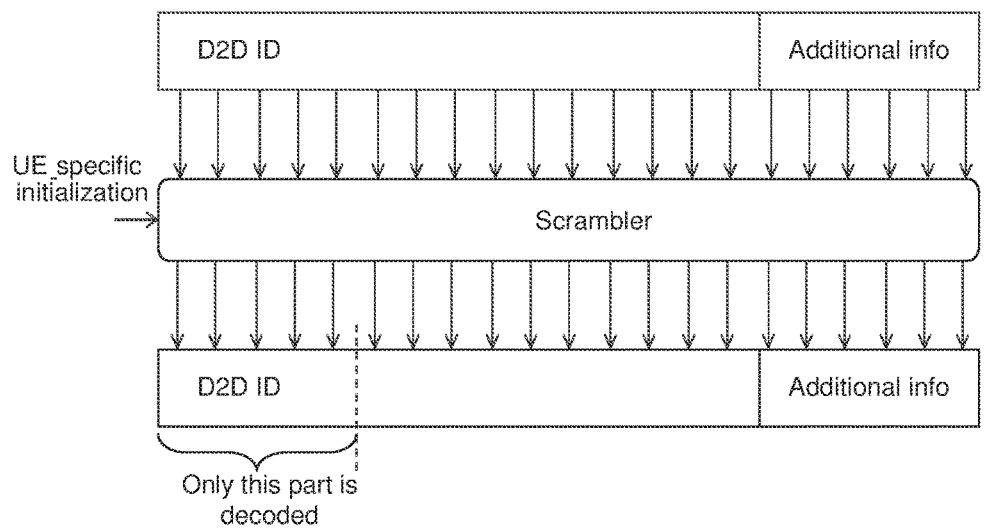
FIG. 13c illustrates partial bit matching operates on bits that are a function of the whole payload, with the new scrambler.

If a scrambler is introduced before the encoder (and a corresponding descrambler at the receiver) according to embodiments herein, the probability of consistent discovery signal false detection may be minimized or at least reduced. It is assumed, in some embodiments, that the scrambling sequence is a combination of the discovery signal payload and other parameters (e.g., time slot index, resource index, etc.) that vary at different periodic transmissions of the same discovery signal. Therefore, the probability that N scrambled bits of two different discovery signals match at consecutive discovery signal receptions is minimized. FIG. 13c illustrates that with the proposed scrambler, partial bit matching operates on bits that are a function of the whole payload.

If the scrambling sequence is a function of the whole discovery signal payload, or at least of the portion of the payload that corresponds to the D2D identity (or a significant fraction thereof), the advantages of the interleaver solution may be obtained by introducing only the scrambler.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by claims appended hereto.

ABBREVIATIONS

CRC cyclic redundancy check
D2D device-to-device
D2D ID device-to-device identity
BER Bit Error Rate
NW Network
DMRS Demodulation Reference Signals
PRB Physical Resource Block
UL uplink
DL downlink
UE user equipment

What is claimed is:

1. A method executed in a wireless terminal configured for device-to-device (D2D) discovery, the method comprising:
applying a hashing function to a control signal, wherein the control signal carries an identity and a time stamp corresponding to the control signal transmission;
encoding the control signal and the hashed control signal; and
transmitting the encoded control signal and encoded hashed control signal.

2. The method of claim 1, wherein the encoded control signal and encoded hashed control signal are transmitted to enable D2D discovery.

3. The method of claim 1, wherein the identity comprises an identity of the wireless terminal.

4. The method of claim 1, wherein the identity comprises one portion that is shared by several wireless terminals.

5. The method of claim 1, wherein the control signal comprises a signal payload and wherein the method further comprises inserting the time stamp used for control signal transmission in the payload of the control signal, before applying the hashing function to the control signal.

6. The method of claim 1, wherein the method further comprises scrambling the encoded hashed control signal.

7. A wireless terminal configured for device-to-device (D2D) discovery, the wireless terminal comprising:
  processing circuitry configured to apply a hashing function to a control signal, wherein the control signal carries an identity and a time stamp corresponding to the control signal transmission;
  baseband circuitry configured to encode the control signal and the hashed control signal; and
  transmit circuitry configured to transmit the encoded control signal and encoded hashed control signal.

8. The wireless terminal of claim 7, wherein the encoded control signal and encoded hashed control signal are transmitted to enable D2D discovery.

9. The wireless terminal of claim 7, wherein the identity comprises an identity of the wireless terminal.

10. The wireless terminal of claim 7, wherein the identity comprises a ProSe user identity or an application layer user identity, or both.

11. The wireless terminal of claim 7, wherein the control signal comprises signal payload and wherein the processing circuitry is further adapted to insert the time stamp used for control signal transmission in the payload of the control signal, before hashing the control signal.

12. The wireless terminal of claim 7, wherein the wireless terminal is a user equipment.

13. A non-transitory computer-readable medium comprising, stored thereupon, a computer program comprising computer readable code that, when run on a wireless terminal, causes the wireless terminal to:
  apply a hashing function to a control signal, wherein the control signal carries an identity and a time stamp corresponding to the control signal transmission;
  encode the control signal and the hashed control signal; and
  transmit the encoded control signal and encoded hashed control signal.

* * * * *

UNITED STATES PATENT AND TRADEMARK OFFICE
CERTIFICATE OF CORRECTION

PATENT NO. : 10,149,301 B2
APPLICATION NO. : 15/660407
DATED : December 4, 2018
INVENTOR(S) : Stefano Sorrentino It is certified that error appears in the above-identified patent and that said Letters Patent is hereby corrected as shown below:

In the Drawings

In Fig. 7, Sheet 7 of 13, for Step "S4/S11", in Lines 1-2, delete "transmitbeacon" and insert -- transmit beacon --, therefor.

In Fig. 11b, Sheet 11 of 13, for Step "S115c", in Line 1, delete "becon" and insert -- beacon --, therefor.

In Fig. 13c, Sheet 13 of 13, delete "UE_specific" and insert -- UE-specific --, therefor.

In the Specification

In Column 4, Line 14, delete "blocks" and insert -- blocks. --, therefor.

In Column 4, Line 16, delete "blocks" and insert -- blocks. --, therefor.

In Column 4, Line 18, delete "(transmitter)" and insert -- (transmitter). --, therefor.

In Column 4, Line 20, delete "(receiver)" and insert -- (receiver). --, therefor.

In Column 4, Line 21, delete "scenario" and insert -- scenario. --, therefor.

In Column 4, Line 22, delete "FIGS. 4a and 4c illustrates" and insert -- FIGS. 4a and 4c illustrate --, therefor.

In Column 5, Line 55, delete "~80%" and insert -- ~80% --, therefor.

In Column 9, Line 31, delete "FIGS. 4a and 4b illustrates" and insert -- FIGS. 4a and 4b illustrate --, therefor.

Signed and Sealed this
Fourth Day of February, 2020

Andrei Iancu
*Director of the United States Patent and Trademark Office*

CERTIFICATE OF CORRECTION (continued)
U.S. Pat. No. 10,149,301 B2

In Column 10, Line 44, delete "possible. e.g.," and insert -- possible, e.g., --, therefor.

In Column 11, Lines 47-48, delete "FIG. 6" and insert -- FIG. 5 --, therefor.

In Column 11, Line 48, delete "FIG. 5" and insert -- FIG. 6 --, therefor.

In Column 12, Line 41, delete "Fig. 15." and insert -- Fig. 6. --, therefor.

In Column 12, Line 59, delete "encoder S2b." and insert -- encoder S2. --, therefor.

In Column 14, Line 12, delete "FIG. 10-12" and insert -- FIGS. 10-12 --, therefor.

In Column 15, Line 2, delete "of Figures FIG." and insert -- of FIG. --, therefor.

In Column 15, Line 15, delete "possible" and insert -- possible. --, therefor.

In Column 15, Line 65, delete "an decoder" and insert -- a decoder --, therefor.

In Column 16, Line 3, delete "an de-interleaver" and insert -- a de-interleaver --, therefor.

In Column 16, Line 55, delete "at least of the portion" and insert -- at least the portion --, therefor.